United States Patent
Akima

(10) Patent No.: US 11,520,857 B2
(45) Date of Patent: Dec. 6, 2022

(54) STORAGE MEDIUM AND DATA PROCESSING METHOD

(71) Applicant: FUJITSU LIMITED, Kawasaki (JP)

(72) Inventor: Hisanao Akima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 424 days.

(21) Appl. No.: 16/801,652

(22) Filed: Feb. 26, 2020

(65) Prior Publication Data

US 2020/0285690 A1 Sep. 10, 2020

(30) Foreign Application Priority Data

Mar. 8, 2019 (JP) .............................. JP2019-042945

(51) Int. Cl.
  *G06F 17/18* (2006.01)
  *G06F 30/27* (2020.01)
  (Continued)

(52) U.S. Cl.
  CPC .............. *G06F 17/18* (2013.01); *G06F 30/27* (2020.01); *G06N 3/088* (2013.01); *G06T 9/00* (2013.01);
  (Continued)

(58) Field of Classification Search
  CPC .......... G06F 17/18; G06F 30/27; G06F 30/13; G06F 2119/06; G06F 30/36; G06F 30/30;
  (Continued)

(56) References Cited

U.S. PATENT DOCUMENTS

2018/0268262 A1 9/2018 Osada et al.
2019/0050506 A1* 2/2019 Umetani .................. G06T 17/20

FOREIGN PATENT DOCUMENTS

JP 2000-293556 A 10/2000
JP 2018-152004 A 9/2018
(Continued)

OTHER PUBLICATIONS

Yoo, YoungJoon, et al. "Variational autoencoded regression: high dimensional regression of visual data on complex manifold." Proceedings of the IEEE Conference on Computer Vision and Pattern Recognition. 2017. pp. 2943-2952. (Year: 2017).*

(Continued)

*Primary Examiner* — John E Johansen
(74) *Attorney, Agent, or Firm* — Fujitsu Patent Center

(57) ABSTRACT

A non-transitory computer-readable storage medium storing a program that causes a computer to execute a process, the process includes acquiring, based on a compression model that is acquired by learning processing on a set of data generated by using a combination of values of variables and that compresses dimensions of data, a point corresponding to data generated by using a predetermined combination of the values of variables within a compressed space; acquiring, based on the point corresponding to the data generated by using the predetermined combination, a target point within the space corresponding to a target value of a characteristic changing in accordance with the values of variables, and a regression model within the space for a predetermined variable of variables, a change amount of the predetermined variable; and changing the value of the predetermined variable included in the predetermined combination by using the change amount.

9 Claims, 13 Drawing Sheets

(51) Int. Cl.
  *G06N 3/08*   (2006.01)
  *G06T 9/00*   (2006.01)
  G06F 30/30   (2020.01)
  G06N 3/04    (2006.01)
  G06F 119/06  (2020.01)
  G06F 30/13   (2020.01)
  G06F 30/36   (2020.01)
  G06N 20/00   (2019.01)

(52) U.S. Cl.
  CPC .............. *G06F 30/13* (2020.01); *G06F 30/30* (2020.01); *G06F 30/36* (2020.01); *G06F 2119/06* (2020.01); *G06N 3/0454* (2013.01); *G06N 3/0472* (2013.01); *G06N 20/00* (2019.01)

(58) Field of Classification Search
  CPC ...... G06N 3/088; G06N 20/00; G06N 3/0454; G06N 3/0472; G06T 9/00
  USPC .......................................................... 703/2
  See application file for complete search history.

(56) References Cited

FOREIGN PATENT DOCUMENTS

WO      2017/203262 A2    11/2017
WO   WO-2017203262 A2 *  11/2017   ........... G06F 16/535

OTHER PUBLICATIONS

Guo, Xiaoxiao, Wei Li, and Francesco Iorio. "Convolutional neural networks for steady flow approximation." Proceedings of the 22nd ACM SIGKDD international conference on knowledge discovery and data mining. 2016. p. 481-490. (Year: 2016).*

Hanakata, Paul Z., et al. "Accelerated search and design of stretchable graphene kirigami using machine learning." Physical review letters 121.25 (2018): 255304. p. 255304-1-255304-6. (Year: 2018).*

Guo, Xiaoxiao et al., "Convolutional Neural Networks for Steady Flow Approximation", Proceedings of the 22nd ACM SIGKDD International Conference on Knowledge Discovery and Date Mining, KDD '16, ACM Press, New York, pp. 481-490, Aug. 13, 2016, XP058276867.

Hanakata, Paul Z. et al., "Accelerated Search and Design of Stretchable Grahene Kirigami Using Machine Learning", ARXIV. org, Cornell University Library, 201 Olin Library Cornell University Ithaca, NY 14853, Aug. 18, 2018, pp. 1-9, XP081099688.

Extended European Search Report dated Jul. 27, 2020 for corresponding European Patent No. 20158691.4, 12 pages.

Yoo YoungJoon et al., "Variational Autoencoded Regression: High Dimensional Regression of Visual Data on Complex Manifold", 2017 IEEE Conference on Computer Vision and Pattern Recognition (CVPR), IEEE Computer Society, Jul. 21, 2017, pp. 2943-2952, XP033249640.

European Office Action dated Apr. 4, 2022 for corresponding European Patent Application No. 20158691.4, 6 pages.

* cited by examiner

STORAGE MEDIUM AND DATA PROCESSING METHOD

CROSS-REFERENCE TO RELATED APPLICATION

This application is based upon and claims the benefit of priority of the prior Japanese Patent Application No. 2019-42945, filed on Mar. 8, 2019, the entire contents of which are incorporated herein by reference.

FIELD

The embodiments discussed herein relate to a storage medium and a data processing method.

BACKGROUND

In circuit design, a design space is set by combining design variables indicating circuit parameters. The design variables are used to describe an objective function so that an optimization problem is formulated. In the design space, searching processing is performed which searches an optimum solution (global solution) for optimizing the objective function.

However, when interactions exist between the design variables, the solution space that is a curved surface of the objective function in the design space is multimodal. A plurality of mountains and valleys may exist in the solution space. In this case, through the searching processing according to a simple gradient method, the searching result is easily trapped in a local solution instead of a global solution.

Therefore, mathematical programming, metaheuristics, response surface methodology and so on have been used to find a global solution. The metaheuristics include simulated annealing, genetic algorithm and so on.

In relation to the circuit design, a circuit parameter design method has been known which considers not only variations of performances of manufactured product circuits but also minimization of losses due to the variations (see Japanese Laid-open Patent Publication No. 2000-293556, for example). An information processing apparatus has also been known which executes machine learning with a combination of a recursive neural network and a variational autoencoder. As related art, for example, Japanese Laid-open Patent Publication No. 2000-293556 and Japanese Laid-open Patent Publication No. 2018-152004 have been disclosed.

SUMMARY

According to an aspect of the embodiments, a non-transitory computer-readable storage medium storing a program that causes a computer to execute a process, the process includes acquiring, based on a compression model that is acquired by learning processing on a set of data generated by using a combination of values of variables and that compresses dimensions of data, a point corresponding to data generated by using a predetermined combination of the values of variables within a compressed space; acquiring, based on the point corresponding to the data generated by using the predetermined combination, a target point within the space corresponding to a target value of a characteristic changing in accordance with the values of variables, and a regression model within the space for a predetermined variable of variables, a change amount of the predetermined variable; and changing the value of the predetermined variable included in the predetermined combination by using the change amount.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A common characteristic among conventional methods such as mathematical programming, metaheuristics and response surface methodology is that the iteration count for finding a global solution is reduced by devising the searching processing in the design space. However, because the objective function is described by using design variables, the structure of the solution space is maintained, and a plurality of mountains and valleys still exist in the solution space. Because of that, the time for searching a global solution may not be reduced.

The problem above occurs not only in circuit design but also in searching processing for acquiring a global solution of parameters for various analysis targets. In view of this, it is desirable to efficiently search a proper combination of values of a plurality of variable contributing to a characteristic of an analysis target.

Hereinafter, embodiments will be described in detail with reference to the drawings.

Figure 1:
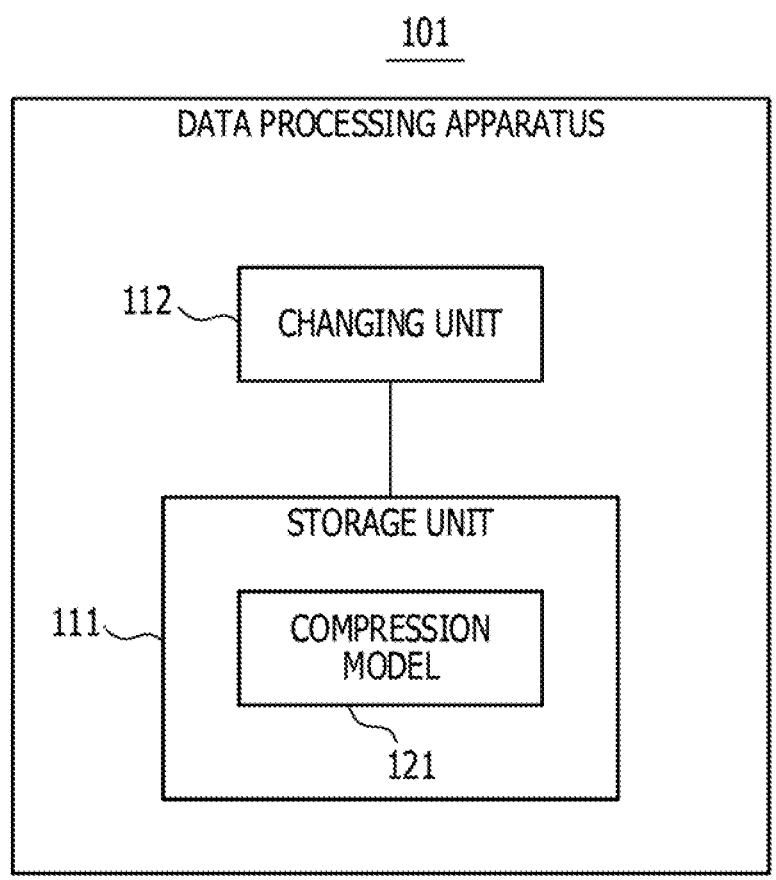
FIG. 1 is a functional configuration diagram of a data processing apparatus.

FIG. 1 illustrates a functional configuration example of a data processing apparatus according to an embodiment. A data processing apparatus 101 in FIG. 1 includes a storage unit 111 and a changing unit 112. The storage unit 111 stores a compression model 121 that is acquired by learning processing performed on a set of data generated by using a combination of values of a plurality of variables and that compresses the dimensions of the data. The changing unit 112 performs data processing by using the compression model 121.

Figure 2:
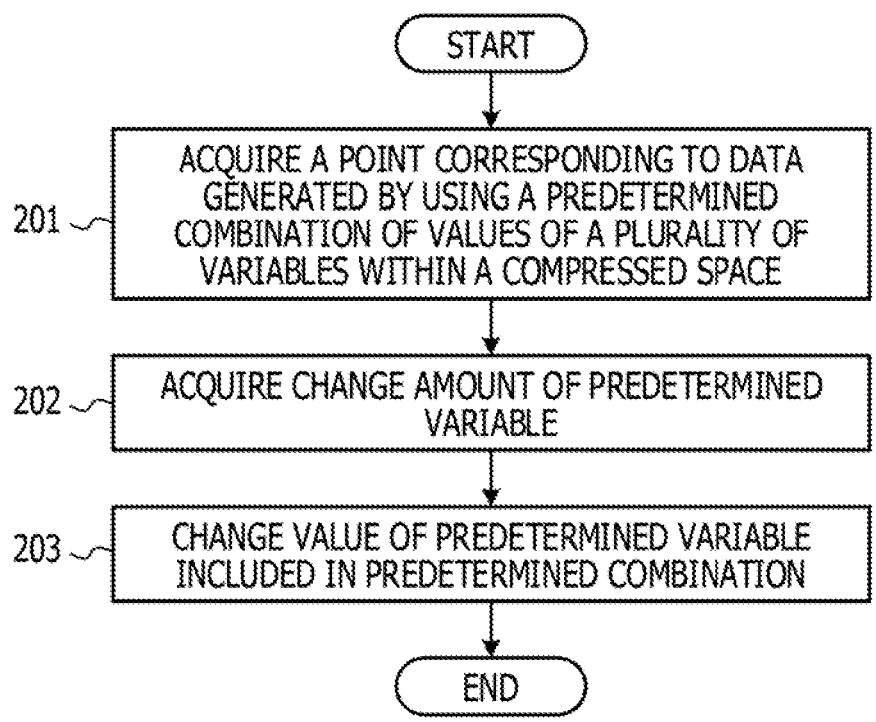
FIG. 2 is a flowchart of data processing.

FIG. 2 is a flowchart illustrating an example of data processing performed by the data processing apparatus 101 in FIG. 1. First, the changing unit 112 acquires a point corresponding to the data generated by using a predetermined combination of values of a plurality of variables within a compressed space based on the compression model 121 (step 201).

Next, based on the point corresponding to the data generated by using the predetermined combination, a target point within the compressed space and a regression model within the compressed space, the changing unit 112 acquires a change amount of a predetermined variable among the plurality of variables (step 202). The target point within the compressed space is a point corresponding to a target value of a characteristic that varies in accordance with the values of the plurality of variables, and the regression model within the compressed space is a regression model for the predetermined variable.

Next, the changing unit 112 changes the value of the predetermined variable included in the predetermined combination by using the acquired change amount (step 203).

With the data processing apparatus 101 in FIG. 1, a proper combination of values of a plurality of variables contributing to a characteristic of an analysis target may be efficiently searched.

Figure 3:
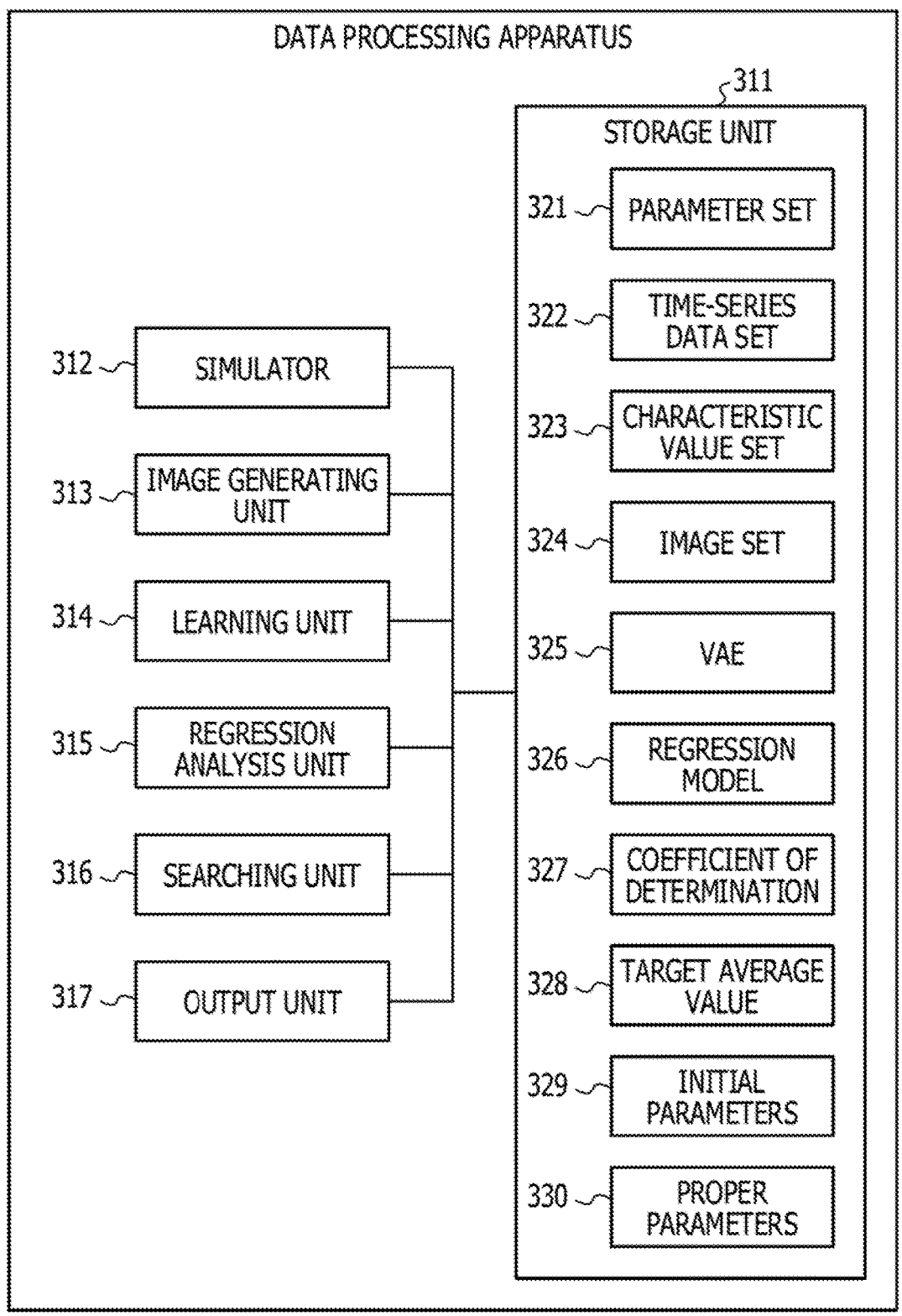
FIG. 3 is a functional configuration diagram of a specific example of the data processing apparatus.

FIG. 3 illustrates a specific example of the data processing apparatus 101 in FIG. 1. A data processing apparatus 301 in FIG. 3 includes a storage unit 311, a simulator 312, an image generating unit 313, a learning unit 314, a regression analysis unit 315, a searching unit 316 and an output unit 317. The storage unit 311 and the searching unit 316 correspond to the storage unit 111 and the changing unit 112 in FIG. 1, respectively.

The data processing apparatus 301 performs data processing for optimizing parameters of an analysis target by using artificial intelligence. For example, the analysis target in circuit design is an electric circuit, an electronic circuit or the like, and the parameters in circuit design are a resistance value, a capacitance, an inductance and the like.

The data processing apparatus 301 may also perform data processing such as structural analysis, electromagnetic field analysis, fluid analysis, and image analysis. The analysis target in structural analysis is a building, a product or the like and the analysis target in electromagnetic field analysis is a wireless communication circuit, an antenna or the like. The analysis target in fluid analysis is air, water or the like, and the analysis target in image analysis is an image of any one of various objects.

The storage unit 311 stores a parameter set 321 and initial parameters 329. The parameter set 321 and the initial parameters 329 include values of variables representing a plurality of parameters of an analysis target. The parameter set 321 is a set of a plurality of combinations of values of a plurality of variables to be used for learning processing. The initial parameters 329 include a combination of values of a plurality of variables indicating initial values for searching processing.

In learning processing, the simulator 312 executes a simulation on an analysis target by using the parameter set 321 to generate a set of time-series data representing a simulation result and store it in the storage unit 311 as time-series data set 322.

The simulator 312 generates a set of characteristic values of the analysis target corresponding to a plurality of time-series data pieces and store it in the storage unit 311 as a characteristic value set 323. A characteristic of an analysis target varies in accordance with values of a plurality of parameters, and a simulation using combinations included in the parameter set 321 determines characteristic values corresponding to the combinations. For example, as a characteristic in circuit design of a power supply circuit, the efficiency of the power supply circuit may be used.

The image generating unit 313 generates images representing time-series data pieces included in the time-series data set 322 and stores a set of images generated from the plurality of time-series data pieces in the storage unit 311 as an image set 324. The image set 324 corresponds to a set of data pieces to be learned.

The learning unit 314 performs learning processing on the image set 324 to generate a variational autoencoder (VAE) 325 and stores it in the storage unit 311. The VAE 325 corresponds to the compression model 121 in FIG. 1.

An autoencoder (AE) is a compression model that generates a latent space representation being a characteristic representation having a reduced amount of information because of compression of the dimensions of input data by using a neural network. The latent space represents a low-dimensional space after a compression. The VAE is a compression model applying a probability distribution to latent variables representing the latent space of the AE.

Figure 4:
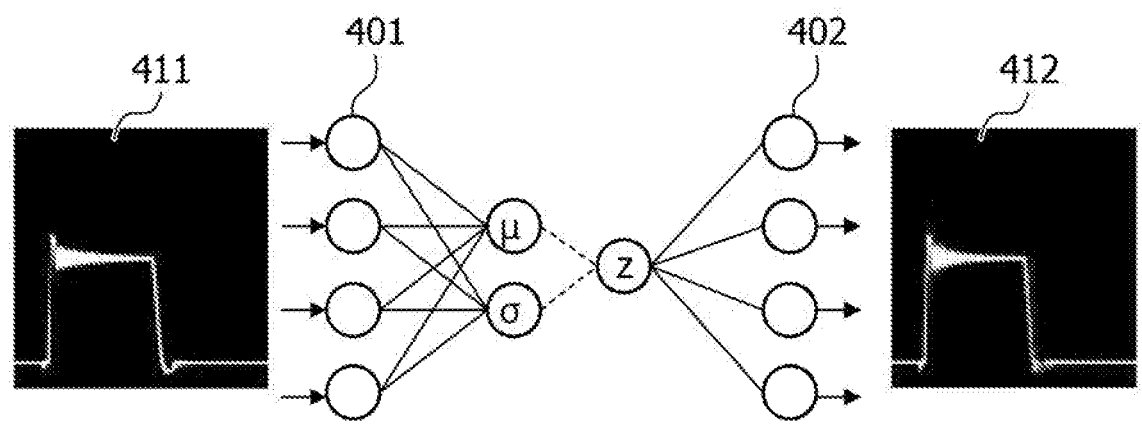
FIG. 4 is a diagram illustrating a VAE in a circuit design of, a power supply circuit.

FIG. 4 illustrates an example of the VAE 325 in circuit design of a power supply circuit. The VAE 325 in FIG. 4 includes encoders 401 and decoders 402 and generates an output image 412 from an input image 411. The input image 411 represents a time-series data of voltage (voltage waveform) at a node within the power supply circuit, which is generated by a circuit simulation on the power supply circuit.

The value of a latent variable z is calculated based on a probability distribution having an average $\mu$ and a distribution $\sigma$. The encoders 401 convert the input image 411 to $\mu$ and $\sigma$, and the decoders 402 convert z calculated based on the $\mu$ and $\sigma$ to the output image 412.

The learning unit 314 learns the parameters of the encoders 401 and the decoders 402 by using the images of the voltage waveforms generated by the circuit simulation using the parameter set 321 as the input image 411 for training.

The regression analysis unit 315 generates a regression model 326 for the variables representing the parameters of the analysis target by using the image set 324 and the VAE 325 and stores it in the storage unit 311. An objective variable of the regression model 326 is a variable representing a parameter of an analysis target, and explanatory variables of the regression model 326 are a plurality of latent variables representing a latent space of the VAE 325.

Next, the regression analysis unit 315 acquires a coefficient of determination 327 for the regression model 326 by using the image set 324, the VAE 325, and the regression model 326 and stores it in the storage unit 311. The coefficient of determination 327 is an example of a reliability representing the reliability of the regression model 326, and the reliability of the regression model 326 increases as the coefficient of determination 327 increases.

The regression analysis unit 315 acquires a target average value 328 of each latent variable corresponding to a target value of a characteristic and stores it in the storage unit 311. The target average value 328 of each of a plurality of latent variables represents a target point within the latent space.

The regression model 326, the coefficient of determination 327 and the target average value 328 along with the VAE 325 are acquired in the learning processing so that efficient searching processing is implemented based on the information.

In the searching processing, the simulator 312 generates time-series data by executing a simulation using the initial parameters 329 and calculates a characteristic value for the time-series data. The image generating unit 313 generates an image representing the generated time-series data.

The searching unit 316 acquires an initial average value of each of the latent variables by using the VAE 325 from the image generated by using the initial parameters 329. An initial average value of each of the plurality of latent variables represents a search starting point within the latent space. The searching unit 316 acquires a change amount of each of the variables from the initial average values and the target average values 328 by using the regression model 326 for the variables and changes the values of the variables included in the initial parameters 329 by using the change amounts.

For example, the searching unit 316 uses the regression model 326 to acquire a first value of each of the variables from the target average value 328 and acquire a second value of each of the variables from the initial average value and acquires a change amount by using a difference between the first value and the second value and the coefficient of determination 327. Thus, the change amount reflects a difference between the search starting point and the target point within the latent space and the reliability of the regression model 326.

Next, the simulator 312 generates time-series data by executing a simulation using the changed values of the variables and calculates characteristic value for the time-series data.

If the difference between the calculated characteristic value and the target value is higher than a threshold value, the image generating unit 313 generates an image representing the generated time-series data. Next, the searching unit 316 acquires an average value of each of the latent variables from the generated image by using the VAE 325. An average value of each of the plurality of latent variables represents a current search point within the latent space.

The searching unit 316 acquires a change amount of each of the variables from the average values representing the current search points and the target average values 328 by using the regression model 326 for the variables and further changes the values of the changed variables by using the change amounts. In this case, the searching unit 316 acquires change amounts from the changed values by using the average values representing the current search points instead of the initial average values in the same manner as the processing for the change amounts from the initial parameters 329. Thus, the change amount reflects a difference between the current search points and the target point within the latent space and the reliability of the regression model 326.

The simulator 312, the image generating unit 313 and the searching unit 316 repeat the processing of changing the values of the variables until the difference between the characteristic value and the target value gets lower than the threshold value. When the difference gets lower than the threshold value, the searching unit 316 stores the values of the variables in the storage unit 311 as proper parameters 330, and the output unit 317 outputs the proper parameters 330.

For example, in a case where the data processing is a circuit design, the data processing apparatus 301 generates a circuit diagram of an electric circuit or an electronic circuit by using circuit parameters represented by the proper parameters 330. In a case where the data processing is a structural analysis, the data processing apparatus 301 generates a design drawing for a building, a product or the like by using the proper parameters 330.

In a case where the data processing is an electromagnetic field analysis, the data processing apparatus 301 generates a design drawing for a wireless communication circuit, an antenna or the like by using the proper parameters 330. In a case where the data processing is a fluid analysis, the data processing apparatus 301 generates an analysis result with respect to a flow of air, water or the like by using the proper parameters 330. In a case where the data processing is an image analysis, the data processing apparatus 301 generates an analysis result with respect to an image of an object by using the proper parameters 330.

Figure 5:
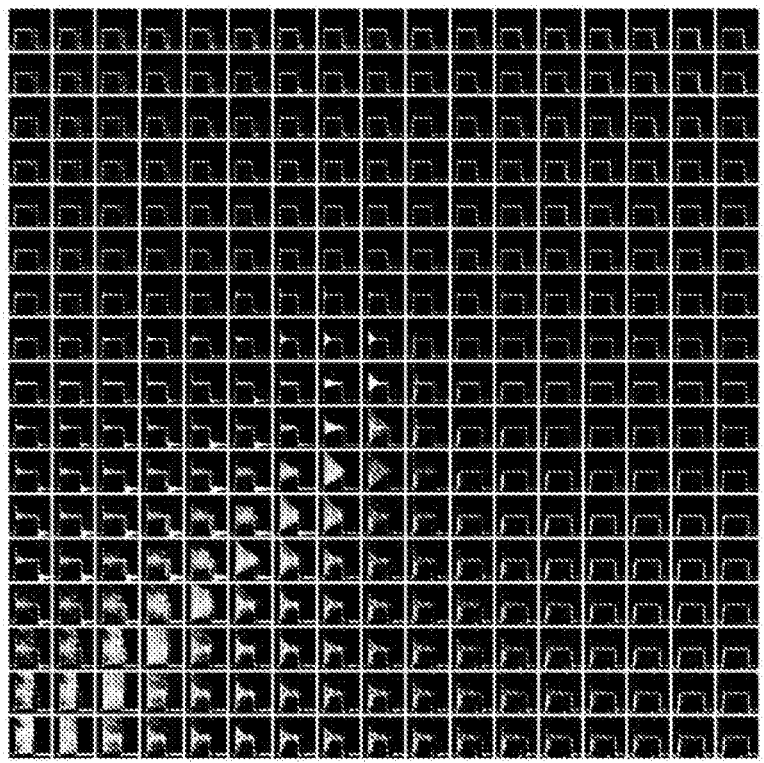
FIG. 5 is a diagram illustrating images plotted in a latent space.

FIG. 5 illustrates an example of images plotted in the latent space of the VAE 325 in FIG. 4. The latent space in FIG. 5 is a two-dimensional plane, and two latent variables represent two-dimensional coordinates on the plane. In this example, images illustrating voltage waveforms at nodes within a power supply circuit are plotted at positions indicated by the values of the latent variables generated by the VAE 325.

Due to the characteristic of the VAE 325, voltage waveforms that are similar to each other are plotted at positions that are closer to each other on the plane. For the voltage waveforms plotted at mutually close positions, the circuit parameters for generating the voltage waveforms are also similar. Therefore, it may be considered that the circuit parameters for a plurality of voltage waveforms aligned in a specific direction within the latent space change serially in the direction.

By searching proper values of the latent variables within the latent space by using the characteristic of the VAE 325, the structure of the objective function in the optimization problem of the circuit design changes, and the number of changes of circuit parameters in the searching processing may be reduced. Therefore, the circuit parameters may be rapidly and easily optimized.

Next, learning processing and searching processing to be performed by the data processing apparatus 301 in FIG. 3 will be described in further detail. Hereinafter, the ith (i=1 to m) parameter of an analysis target is represented by a variable p(i). The parameter set 321 is expressed by the following expressions.

$$\Pi = \{P1, P2, \ldots, Pk\} \quad (1)$$

$$Pj = (pj(1), pj(2), \ldots, pj(m)) \quad (2)$$

Pj (j=1 to k) is a vector representing the jth element of the parameter set Π, and k represents the number of elements of the parameter set Π. pj(i) (i=1 to m) represents a value of the variable p(i) included in the vector Pj, and m represents the number of parameters of the analysis target. The time-series data set 322 is expressed by the following expressions.

$$\Gamma = \{\omega 1, \omega 2, \ldots, \omega k\} \quad (3)$$

$$\omega j = (V1, V2, \ldots, Vo) \quad (4)$$

$$Va = (va(1), va(2), \ldots, va(t)) \quad (5)$$

ωj represents the jth element of the time-series data set Γ, and o represents the number of focus points of the analysis target. In a case of a circuit simulation, the focus points correspond to nodes within a circuit. In a case of finite element method such as structure analysis and fluid analysis, the focus points correspond to nodes of a computational grid. Va (a=1 to o) represents a time-series vector of the ath focus point included in the time-series data ωj. va(b) (b=1 to t) represents the bth element (at the time b) of the time-series vector Va, and t represents the dimension of the time-series vector Va. The characteristic set 323 is expressed by the following expression.

$$\Lambda = \{\eta 1, \eta 2, \ldots, \eta k\} \quad (6)$$

ηj represents the jth element (characteristic value) of the characteristic set $\Lambda$. The image set 324 is expressed by the following expressions.

$$\xi = \{X1, X2, \ldots, Xk\} \quad (7)$$

$$Xj = (G2, G2, \ldots, Go) \quad (8)$$

$$Ga = (ra(1), ra(2), \ldots, ra(u)) \quad (9)$$

Xj represents the jth element of the image set $\xi$, and Ga (a=1 to o) represents a grayscale image at the ath focus point included in Xj. ra(c) (c=1 to u) represents a pixel value of the cth pixel of the image Ga, and u represents the dimension (pixel count) of the image Ga. Hereinafter, images G1 to Go may collectively be called "image Xj".

Figure 6:
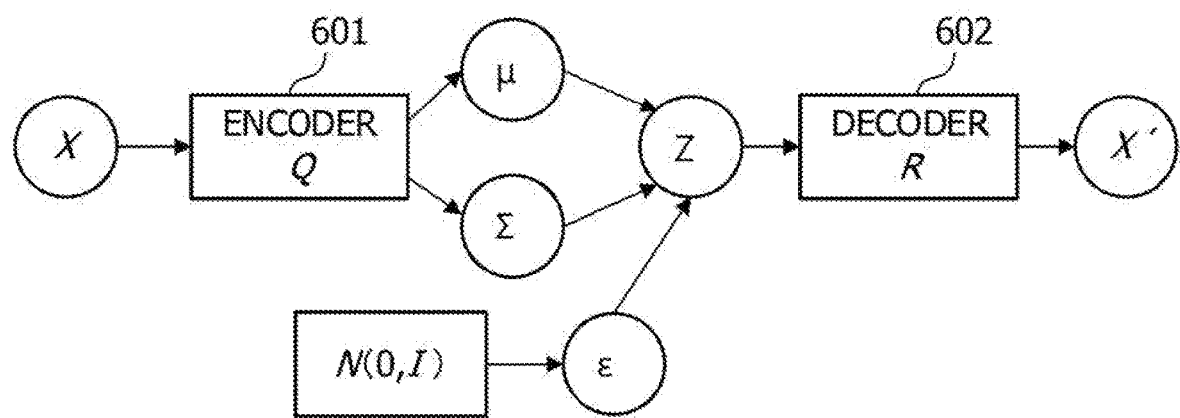
FIG. 6 is a diagram illustrating learning processing on a VAE.

FIG. 6 illustrates learning processing on the VAE 325. The VAE 325 in FIG. 6 includes an encoder 601 and a decoder 602 and generates an output image X' from an input image X. The input image X corresponds to the image Xj in Expression (8).

The encoder 601 has a probability distribution Q, and the decoder 602 has a probability distribution R. The encoder 601 and the decoder 602 are generated by using a hierarchical neural network and include weights and biases as parameters.

A latent variable Z is equivalent to an n-dimensional vector randomly sampled from n-dimensional normal distribution $N(\mu, \Sigma)$ of an average $\mu$ and a distribution $\Sigma$ and is expressed by the following expression.

$$Z = \mu + \Sigma^{1/2} \odot \varepsilon = (z1, z2, \ldots, zn) \quad (10)$$

ε represents an n-dimensional vector randomly sampled from an n-dimensional standard normal distribution N(0, I), and is a product (Hadamard product) of each element of two vectors. zd (d=1 to n) represents the dth element of the latent variable Z.

The encoder 601 converts the input image X to $\mu$ and $\Sigma$ and the decoder 602 converts the latent variable Z calculated by Expression (10) by using the $\mu$ and $\Sigma$ to the output image X'. The input image X has o×u dimensions, and the latent variable Z has n dimensions. Thus, by inputting the input image X to the encoder 601, o×u dimensional data are compressed to n dimensional data. A loss L of the VAE 325 is expressed by the following expression.

$$L = D_{KL}(Q(Z|X) \| N(0,I)) - E[\log R(X|Z)] \quad (11)$$

The first term of the right side of Expression (11) represents a regularized loss, and the second term represents a reconstruction loss. $D_{KL}(PA \| PB)$ is a scale for measuring a difference between a probability distribution PA and a probability distribution PB and is called "Kullback-Leibler divergence". The Kullback-Leibler divergence is equal to zero only when PA and PB are completely matched and otherwise it is equal to a positive value. E[A] represents an expected value of A. As an approximation of the reconstruction loss, a square sum error, a cross entropy error or the like between the input image X and the output image X' is used.

The learning unit 314 learns parameters of the encoder 601 and the decoder 602 for the image set $\xi$ in Expression (7) such that the loss L in Expression (11) is minimized. Minimization of the regularized loss allows conversion of images that are similar to each other to points that are close to each other within the latent space.

By using the image set $\xi$ in Expression (7) and the VAE 325 including the parameters determined by the learning processing, the regression analysis unit 315 performs a regression analysis on each variable pi to generate the regression model 326. First, the regression analysis unit 315 inputs the image set $\xi$ to the encoder 601 and generates a set M of the average values of the latent variable Z. The set M of the average values is represented by the following expressions.

$$M = \{\mu 1, \mu 2, \ldots, \mu k\} \quad (12)$$

$$\mu j = (\mu j(1), \mu j(2), \ldots, \mu j(n)) \quad (13)$$

μj is an n-dimensional vector representing an average value of the latent variable Z generated from the image Xj, and μj(d) (d=1 to n) represents the dth element of the vector μj. Next, the regression analysis unit 315 generates a normal equation as follows for each variable p(i).

$$\begin{bmatrix} p1(i) \\ p2(i) \\ \vdots \\ pk(i) \end{bmatrix} = \begin{bmatrix} 1 & \mu 1(1) & \ldots & \mu 1(n) \\ 1 & \mu 2(1) & \ldots & \mu 2(n) \\ \vdots & \vdots & \ddots & \vdots \\ 1 & \mu k(1) & \ldots & \mu k(n) \end{bmatrix} \begin{bmatrix} \alpha i \\ \beta i(1) \\ \vdots \\ \beta i(n) \end{bmatrix} \quad (14)$$

αi and βi(d) (i=1 to m, d=1 to n) are parameters of a multiple linear regression model. The regression analysis unit 315 solves the normal equation by the least squares method to acquire α and βi(d). The equation of a regression hyperplane within the n-dimensional latent space, which is determined by αi and βi(d), is expressed by the following expression.

$$yi(z1, z2, \ldots, zn) = \alpha i + \beta i(1)z1 + \beta i(2)z2 + \ldots + \beta i(n)zn \quad (15)$$

The regression hyperplane of Expression (15) represents the regression model 326 for the variable p(i). Next, the regression analysis unit 315 acquires a coefficient of determination 327 for the regression model 326 by using the image set $\xi$ of Expression (7), the VAE 325, and the regression hyperplane of Expression (15). First, by using Expression (15), the regression analysis unit 315 calculates an estimated value yj(i) (j=1 to k) of pj(i) from the set M of the average values of Expression (12).

$$yj(i) = \alpha i + \beta i(1)\mu j(1) + \beta i(2)\mu j(2) + \ldots + \beta i(n)\mu j(n) \quad (16)$$

The regression analysis unit 315 calculates a coefficient of determination $Ri^2$ of the regression model 326 for the variable p(i).

$$Ri^2 = 1 - \frac{\sum_{j=1}^{k} (pj(i) - yj(i))^2}{\sum_{j=1}^{k} (pj(i) - p_{AVE}(i))^2} \quad (17)$$

$p_{AVE}(i)$ represents an average value of p1(i) to pk(i). As the distance between $Ri^2$ of Expression (17) and 1 decreases, the relative residual in the regression analysis decreases, which means that the regression model 326 well fits to the set M of the average values. Therefore, as $Ri^2$ increases, the reliability of the regression model 326 increases.

There is a tendency that $Ri^2$ increases as the number of explanatory variables increases. Therefore, in order to compare values of $Ri^2$ by changing the dimension of the latent space, an operation such as using $Ri^2$ having an adjusted degree of freedom is preferably performed.

Next, the regression analysis unit 315 associates the characteristic values ηj included in the characteristic value set Λ of Expression (6) and the average values μj included in the set M of the average values, selects the average value μj corresponding to the target value ηt of the characteristic of the analysis target, and records it as a target average value μt.

In the searching processing, the simulator 312 generates time-series data by executing a simulation using the current values of p(1) to p(m) and calculates a characteristic value ηc for the time-series data. The image generating unit 313 generates an image Xc representing the generated time-series data.

The searching unit 316 inputs the image Xc to the encoder 601 and generates an average value pc of the latent variable Z. Next, by using Expression (15), the searching unit 316 calculates an estimated value yi(μt) of p(i) from the average value μt and calculates an estimated value yi(μc) of p(i) from the average value μc. By using a difference Δyi between yi(μt) and yi(μc), the searching unit 316 calculates a change amount Δp(i) by the following expressions.

$$\Delta p(i) = F(Ri^2)\Delta yi \quad (21)$$

$$\Delta yi = yi(\mu t) - yi(\mu c) \quad (22)$$

$F(Ri^2)$ represents a monotonically increasing function of the coefficient of determination $Ri^2$. In Expression (21), Δyi is multiplied by $F(Ri^2)$ to reflect the likelihood of the multiple linear regression to Δp(i). By using Δp(i) of Expression (21), the searching unit 316 updates the current values of p(1) to p(m) by the following Expression.

$$p(i) = p(i) + \Delta p(i) \quad (23)$$

By updating the values of the variables p(i) by Expression (23), the parameters of the analysis target may be brought closer to the value that realizes the target value ηt.

The simulator 312 generates time-series data by executing a simulation using the values of the updated p(i) and calculates a characteristic value ηc for the time-series data. The image generating unit 313 generates an image Xc representing the generated time-series data. Thus, in accordance with the value of the updated p(i), the characteristic value ηc and the image Xc are updated. The searching unit 316 repeats the update of p(i) until the difference between the updated characteristic value ηc and the target value ηt gets lower than a threshold value.

For example, as the function F(x), a ramp function as in the following expression may be used.

$$F(x) = \begin{cases} g(x-\theta), & x \geq \theta \\ 0, & x < \theta \end{cases} \quad (24)$$

As the function F(x), a sigmoid function as in the following expression may be used.

$$F(x) = \begin{cases} \dfrac{2}{1+e^{-g(x-\theta)}} - 1, & x \geq \theta \\ 0, & x < \theta \end{cases} \quad (25)$$

g in Expression (24) and Expression (25) represents a gain, and θ represents a threshold value. Because the reliability of the regression model 326 decreases as the coefficient of determination $Ri^2$ decreases, it is desirably not to update the value of p(i) when the coefficient of determination $Ri^2$ is lower than a predetermined value. Accordingly, in Expression (24) and Expression (25), the value of the function F(x) is set to 0 when x is lower than the threshold value θ. Other functions having a characteristic similar to a sigmoid function may be used as the function F(x).

Figure 7A:
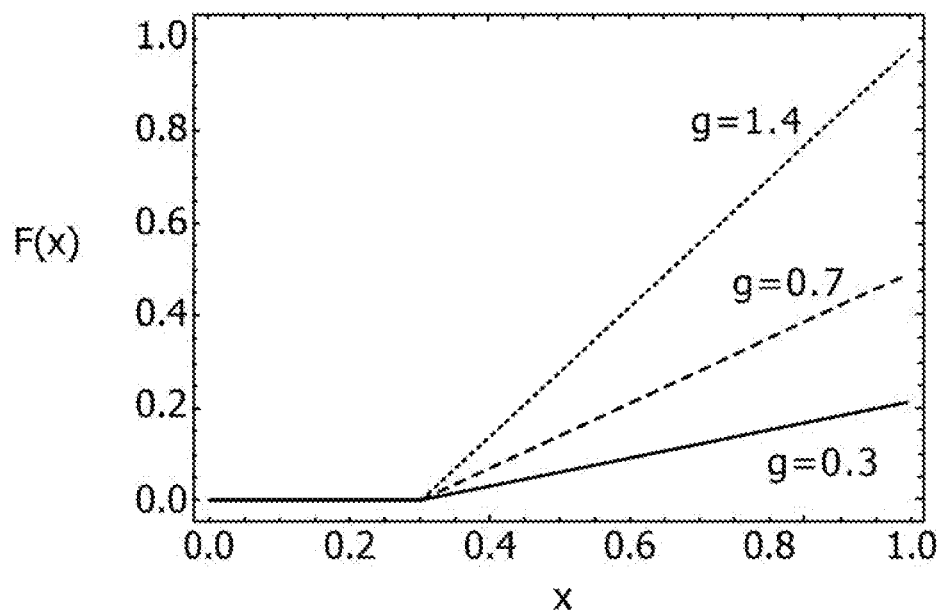
FIGS. 7A and 7B are diagrams illustrating a ramp function and a sigmoid function.
Figure 7B:
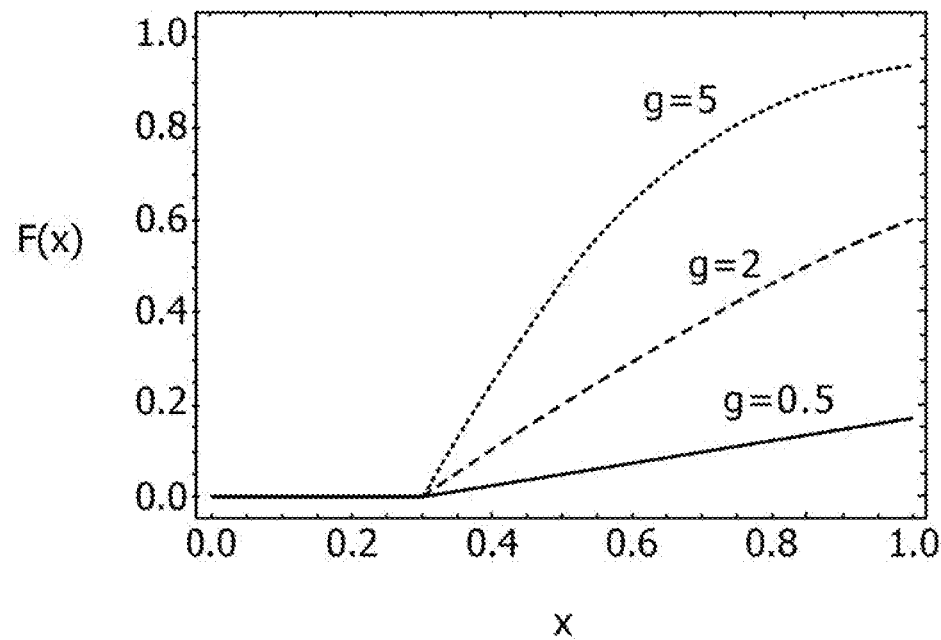

FIGS. 7A and 7B illustrate a ramp function and a sigmoid function for a plurality of values of the gain g. FIG. 7A illustrates an example of a ramp function of Expression (24). In the ramp function in FIG. 7A, θ=0.3, and three function types of g=1.4, g=0.7, and g=0.3 are illustrated.

FIG. 7B illustrates an example of a sigmoid function of Expression (25). In the sigmoid function in FIG. 7B, θ=0.3, and three function types of g=5, g=2, and g=0.5 are illustrated.

For example, in the first half of the searching processing, setting a large value as the gain g may rapidly bring the value of p(i) closer to the direction of the optimum value. On the other hand, in the second half of the searching processing, setting a small value as the gain g ay gradually bring the value of p(i) closer to the direction of the optimum value.

Figure 8:
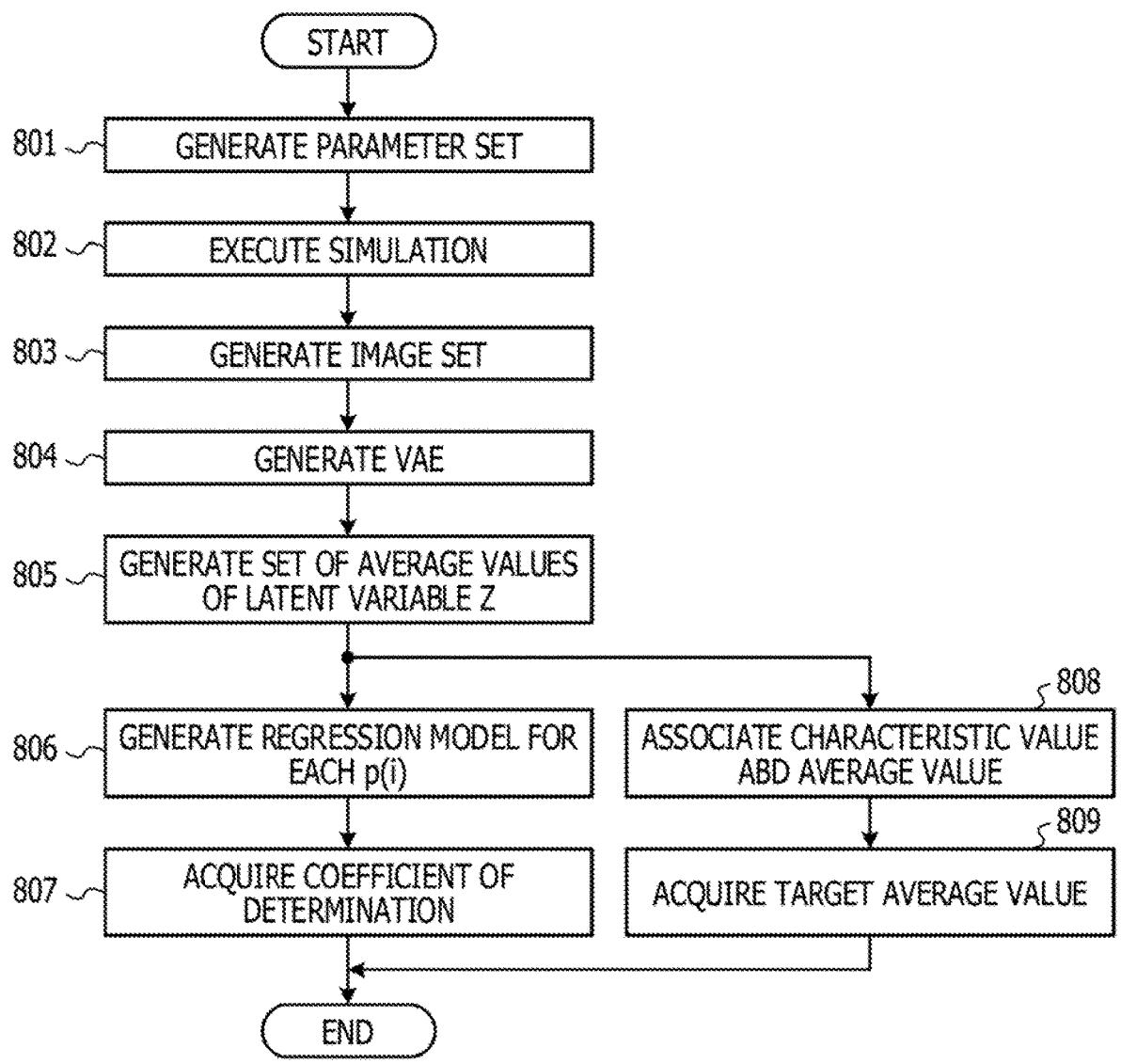
FIG. 8 is a flowchart of learning processing.

FIG. 8 is a flowchart illustrating an example of the learning processing performed by the data processing apparatus 301 in FIG. 3. First, the simulator 312 generates a parameter set 321 (step 801) and executes a simulation by using the parameter set 321 so that a time-series data set 322 and a characteristic value set 323 are generated (step 802).

Next, the image generating unit 313 generates an image set 324 from the time-series data set 322 (step 803), and the learning unit 314 performs learning processing on the image set 324 to generate a VAE 325 (step 804).

Next, the regression analysis unit 315 inputs the image set 324 to the VAE 325 and generates a set of the average values of the latent variable Z (step 805). The regression analysis unit 315 generates a normal equation for each variable p(i) by using the set of the average values and solves the normal equations to acquire an equation of a regression hyperplane within the latent space so that a regression model 326 is generated (step 806).

Next, the regression analysis unit 315 acquires a coefficient of determination 327 for the regression model 326 by using the image set 324, the VAE 325, and the regression model 326 (step 807).

The regression analysis unit 315 associates the characteristic values included in the characteristic value set 323 and average values included in the set of the average values of the latent variables Z (step 808) and acquires a target average value 328 corresponding to the target value of the characteristic (step 809).

By performing the learning processing in FIG. 8, time-series data are generated for each combination of values of p(1) to p(m) included in the parameter set 321, and an image that is multi-dimensional data is generated for each time-series data. Thus, the VAE 325 may be caused to learn images exhibiting states of the analysis target that changes with the passage of time.

Figure 9:
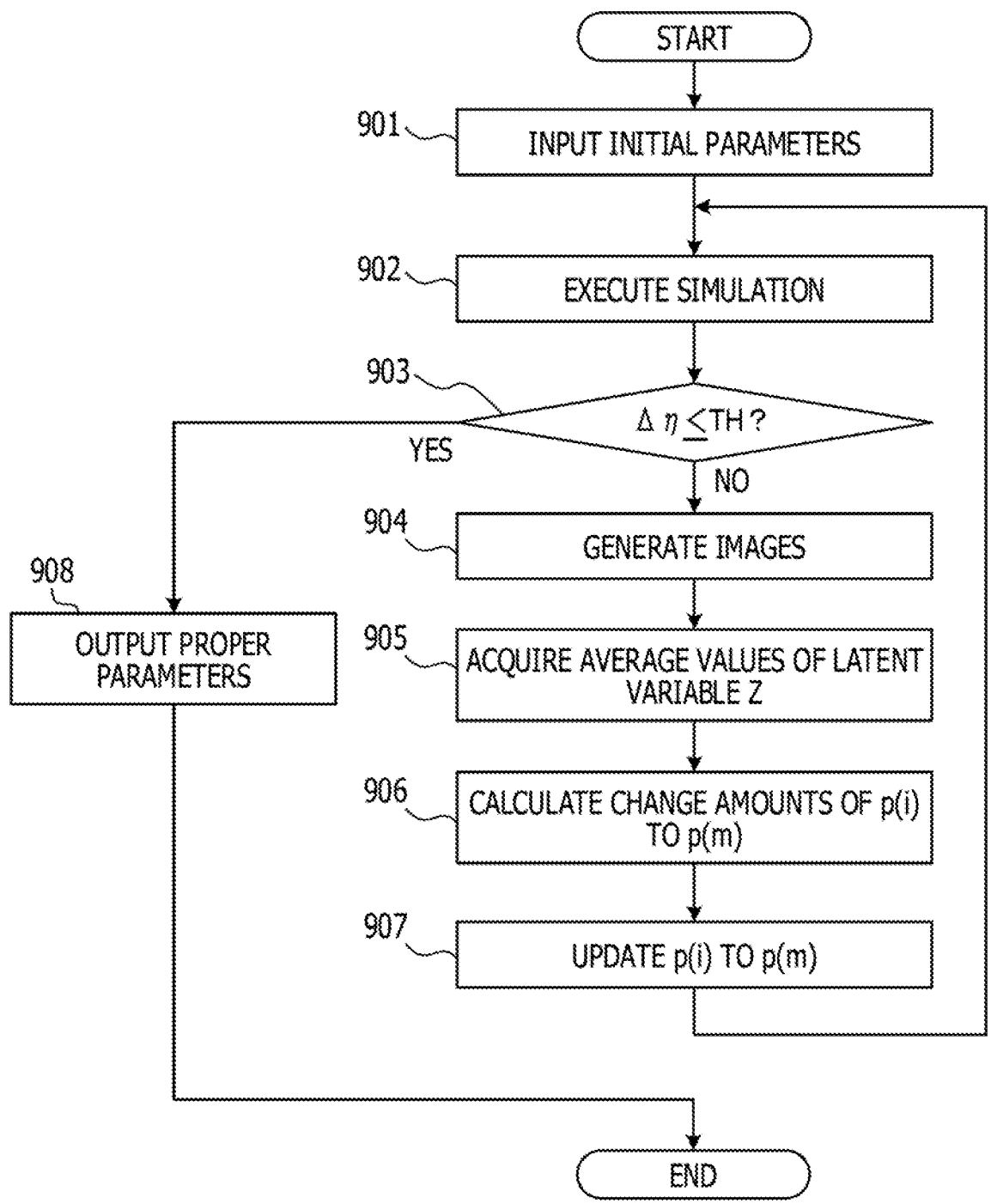
FIG. 9 is a flowchart of searching processing.

FIG. 9 is a flowchart illustrating an example of the searching processing performed by the data processing apparatus 301 in FIG. 3. First, the data processing apparatus 301 inputs the initial parameters 329 to the simulator 312 (step 901). The simulator 312 generates time-series data by executing a simulation using the values of p(1) to p(m) included in the initial parameters 329 and calculates a characteristic value for the time-series data (step 902).

Next, the searching unit 316 compares a difference Δη between the calculated characteristic value and a target value with a threshold value TH (step 903). If Δη is higher than TH (NO in step 903), the image generating unit 313 generates an image representing the generated time-series data (step 904).

Next, the searching unit 316 acquires average values of the latent variables Z from the generated images by using the VAE 325 (step 905). The searching unit 316 calculates change amounts of p(1) to p(m) by using the average values of the latent variables Z, the regression model 326, the coefficient of determination 327 and the target average value 328 (step 906) and updates the values of p(1) to p(m) by using the change amounts (step 907).

Next, the data processing apparatus 301 repeats the processing in step 902 and subsequent steps by using the values of the updated p(1) to p(m). If Δη is equal to or lower than TH (YES in step 903), the searching unit 316 records the current values of p(1) to p(m) as proper parameters 330, and the output unit 317 outputs the proper parameters 330 (step 908).

By performing the searching processing in FIG. 9, the update process for updating the values of p(1) to p(m) is repeated while the difference Δη between the current characteristic value and the target value is compared with the threshold value TH. Thus, the values of p(1) to p(m) may be brought closer to the optimum value for certain. Because m values of p(i) are simultaneously updated by one update process, the proper parameters 330 may be acquired in a shorter period of time than a case where one of values of p(i) is updated.

Next, with reference to FIGS. 10 to 12, a specific example of the learning processing in a circuit design of a power supply circuit will be described.

Figure 10:
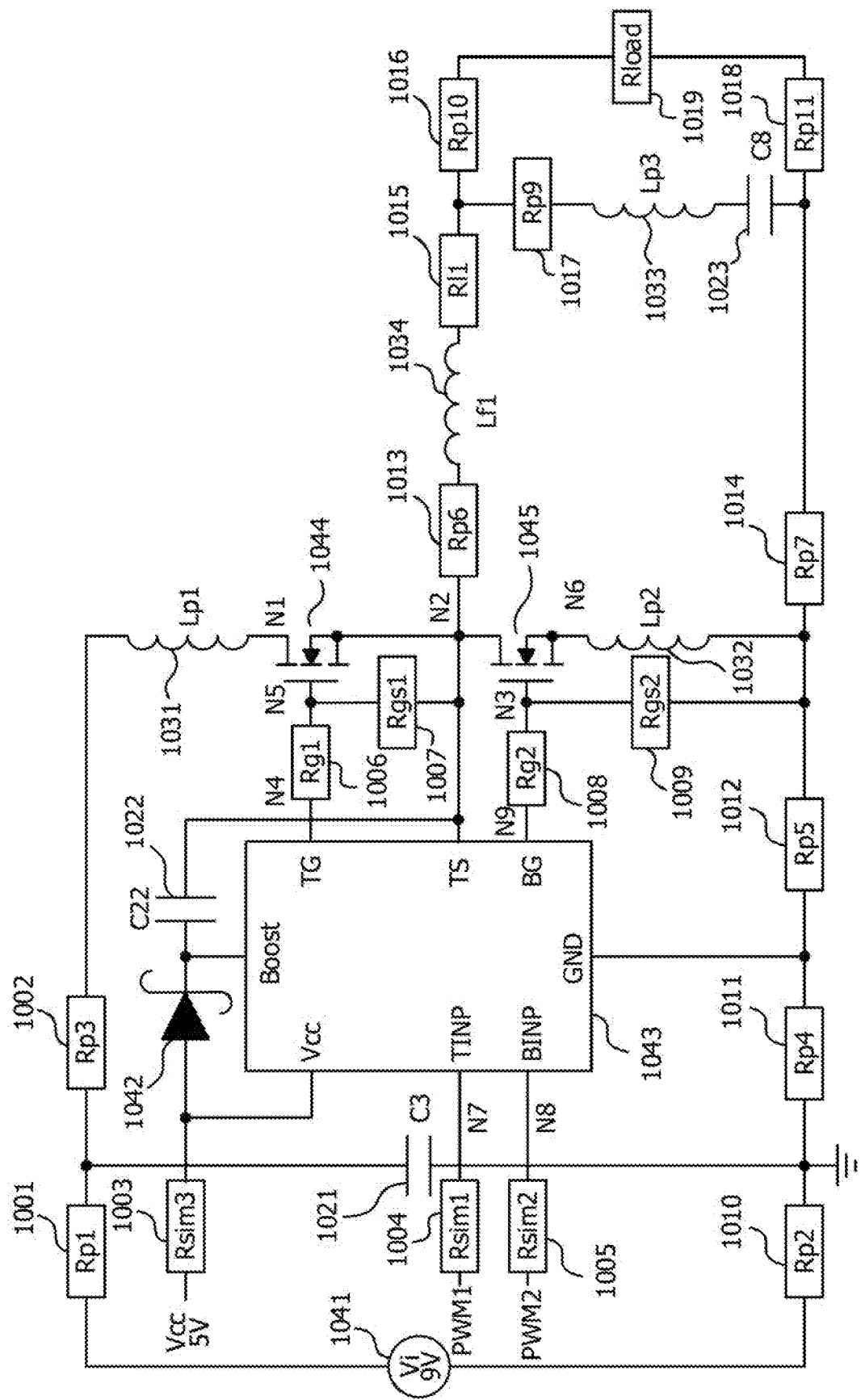
FIG. 10 is a diagram illustrating a power supply circuit.

FIG. 10 illustrates an example of a power supply circuit of an analysis target. The power supply circuit in FIG. 10 includes resistors 1001 to 1019, capacitors 1021 to 1023, parasitic inductances 1031 to 1033, and an inductor 1034. The power supply circuit further includes a 9V-voltage source 1041 (Vi), a diode 1042, an integrated circuit 1043, a field-effect transistor (FET) 1044, and an FET 1045. The resistor 1019 exhibits a load resistance Rload.

Circuit parameters representing resistance values of the resistors 1001 to 1018 are: resistor 1001 Rp1, resistor 1002 Rp3, resistor 1003 Rsim3, resistor 1004 Rsim1, resistor 1005 Rsim2, resistor 1006 Rg1, resistor 1007 Rgs1, resistor 1008 Rg2, resistor 1009 Rgs2, resistor 1010 Rp2, resistor 1011 Rp4, resistor 1012 Rp5, resistor 1013 Rp6, resistor 1014 Rp7, resistor 1015 Rl1, resistor 1016 Rp10, resistor 1017 Rp9, resistor 1018 Rp11.

Circuit parameters representing capacitances of the capacitors 1021 to 1023 are: capacitor 1021 C3, capacitor 1022 C22, capacitor 1023 C8

Circuit parameters exhibiting inductances of the parasitic inductance 1031 to 1033 and the inductor 1034 are: parasitic inductance 1031 Lp1, parasitic inductance 1032 Lp2, parasitic inductance 1033 Lp3, inductor 1034 Lf1

Among them, 12 circuit parameters of Lp1, Lp2, Lp3, Rg1, Rg2, Rgs1, Rgs2, Rl1, Rsim1, Rsim2, Rsim3, and C8 are used as p(1) to p(12). Therefore, m=12. Nodes N1 to N9 within the power supply circuit in FIG. 10 are used as focus points. Therefore, o=9.

Figure 11:
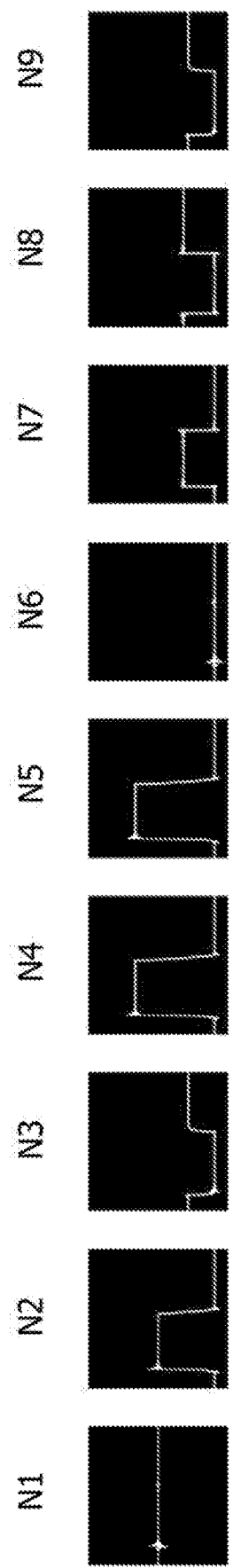
FIG. 11 is a diagram illustrating images of voltage waveforms.

FIG. 11 illustrates examples of images of voltage waveforms at the nodes N1 to N9. t in Expression (5) is 1313, and the size of each of the images is 120×120. The pixel count is equal to 14400 pixels. Therefore, u=14400.

In the learning processing, based on 36 combinations of the values of p(1) to p(12), 100 perturbations are applied to each of the combinations. Nine current values are set as output current of the power supply circuit. Thus, a parameter set Π is generated. In one perturbation, an operation is performed for changing values of the variables randomly between −5% to +5%. In this case, the number k of elements of the parameter set Π is calculated by the following expression.

$$k=36 \times 100 \times 9 = 32400 \tag{26}$$

29160 combinations corresponding to 90% of 32400 combinations are used as training data in the learning processing, and 3240 combinations corresponding to the remaining 10% are used as validation data. Although there is arbitrariness for selection of the configuration of the VAE 325 and the learning algorithm, a standard configuration and learning algorithm are used in this specific example.

In the VAE 325 in FIG. 6, the encoder 601 is a combination of a 4-step convolutional neural network (CNN) and a 2-step fully connected layer (FC), and the decoder 602 is a combination of a 1-step FC and a 2-step CNN.

The batch size is 16, and the number of epochs is 100. Nadam is used as an optimizer. Therefore, 16 images X of o=9 and u=14400 are collectively input to the encoder 601. As an approximation of the reconstruction loss in Expression (11), a cross entropy error between the input image X and the output image X' is used.

Figure 12:
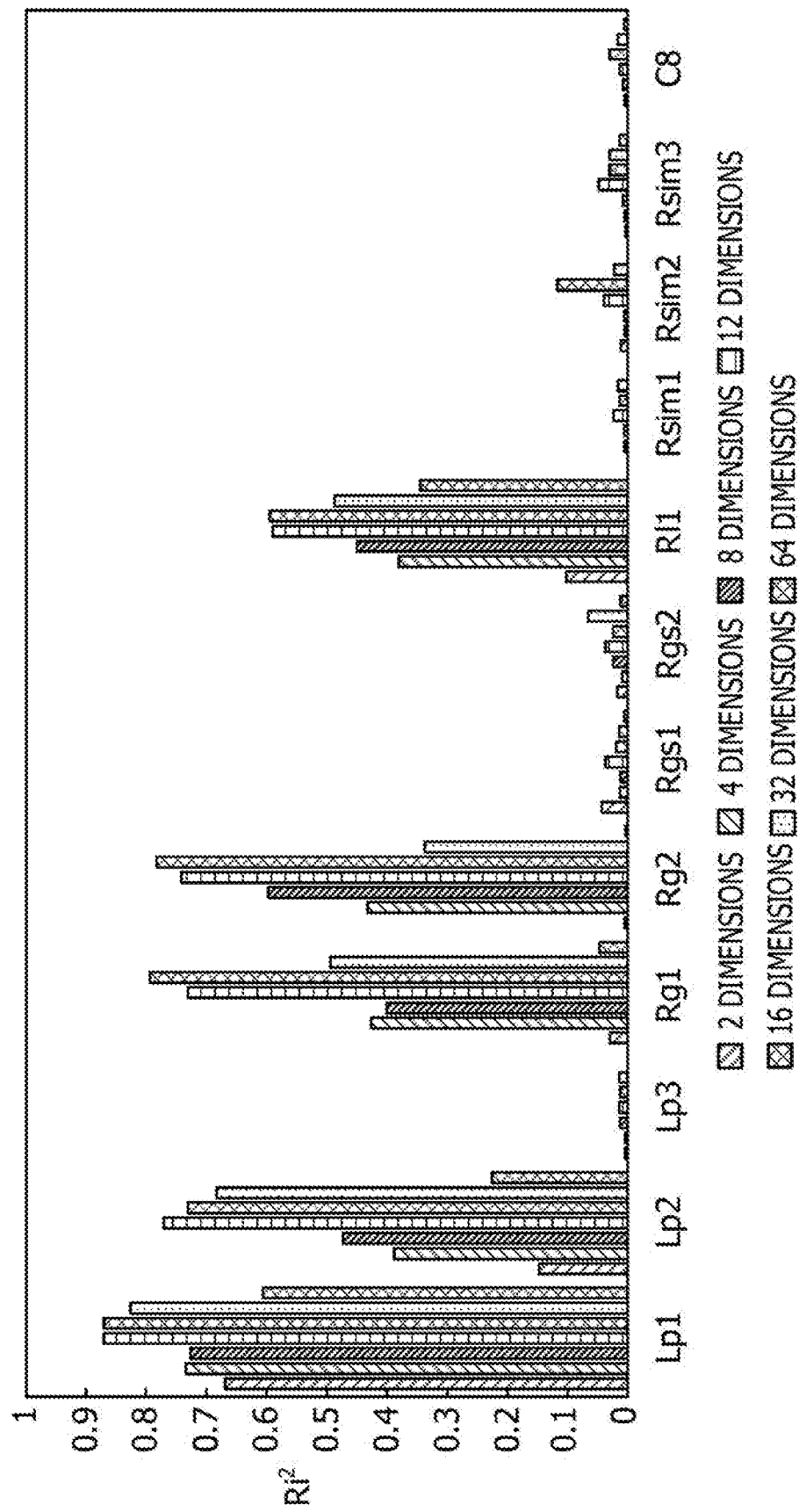
FIG. 12 is a diagram illustrating coefficients of determination against circuit parameters.

FIG. 12 illustrates the coefficient of determination $Ri^2$ against 12 circuit parameters, which is calculated by using 7 latent variables Z of n=2, 4, 8, 12, 16, 32, 64. The calculation results of $Ri^2$ against Lp1, Lp2, Rg1, Rg2, and Rl1 among the 12 circuit parameters include a value higher than 0.5. It is found from the calculation results against the circuit parameters that a good coefficient of determination may be acquired in a latent space having dimensions (n) comparable to the number (m=12) of the circuit parameters of the analysis target.

Thus, because of the generated VAE 325 having a latent space comparable to m dimensions, x in Expressions (24) and (25) may be equal to or higher than the threshold value θ, and F(x)=0 may be avoided. Therefore, because the update of p(i) in the searching processing is facilitated, the proper parameters 330 may be acquired through a lower number of updates.

The configurations of the data processing apparatus 101 in FIG. 1 and the data processing apparatus 301 in FIG. 3 are merely examples, and some components may be omitted or changed according to the use or conditions of the data processing apparatuses. For example, when the learning processing is performed in an external apparatus, the learning unit 314 and the regression analysis unit 315 may be omitted in the data processing apparatus 301 in FIG. 3. When no simulation is required for an analysis target, the simulator 312 may be omitted. When the proper parameters 330 are not required to be output, the output unit 317 may be omitted.

Each of the flowcharts of FIGS. 2, 8, and 9 is merely an example and may have some portions of the processing omitted or modified in accordance with the configuration or the conditions of the data processing apparatus. For example, when the learning processing is performed by an external apparatus, the learning processing in FIG. 8 may be omitted. When no simulation is required to, perform on an analysis target, the processing in step 802 in FIG. 8 and step 902 in FIG. 9 may be omitted.

In the searching processing in FIG. 9, when any one of p(i) values is to be updated by one update process, a change amount of the p(i) is calculated in step 906, and the p(i) value is only updated in step 907.

The VAE 325 illustrated in FIGS. 4 and 6 is merely an example, and the configurations of the encoders and the decoders may be changed according to the use or conditions of the data processing apparatus. The compression model 121 that compresses the dimensions of data may be any other model than the VAE 325.

The latent space illustrated in FIG. 5 is merely an example, and the dimensions of the latent space change according to the analysis target. The function F(x) illustrated in FIGS. 7A and 7B is merely an example, and any other monotonically increasing function may be used as the function F(x). The learning processing illustrated in FIGS. 10 to 12 is merely an example, and the analysis target is changed according to the use of the data processing apparatus.

Each of Expressions (1) to (26) is merely an example, and the data processing apparatus may perform the learning processing and the searching processing by using other expressions. For example, instead of the coefficient of determination $Ri^2$ in Expression (17), another index indicating the reliability of the regression model 326 may be used to calculate $\Delta p(i)$ of Expression (21). Instead of the ramp function in Expression (24) and the sigmoid function in Expression (25), any other monotonically increasing function may be used as the function F(x).

Figure 13:
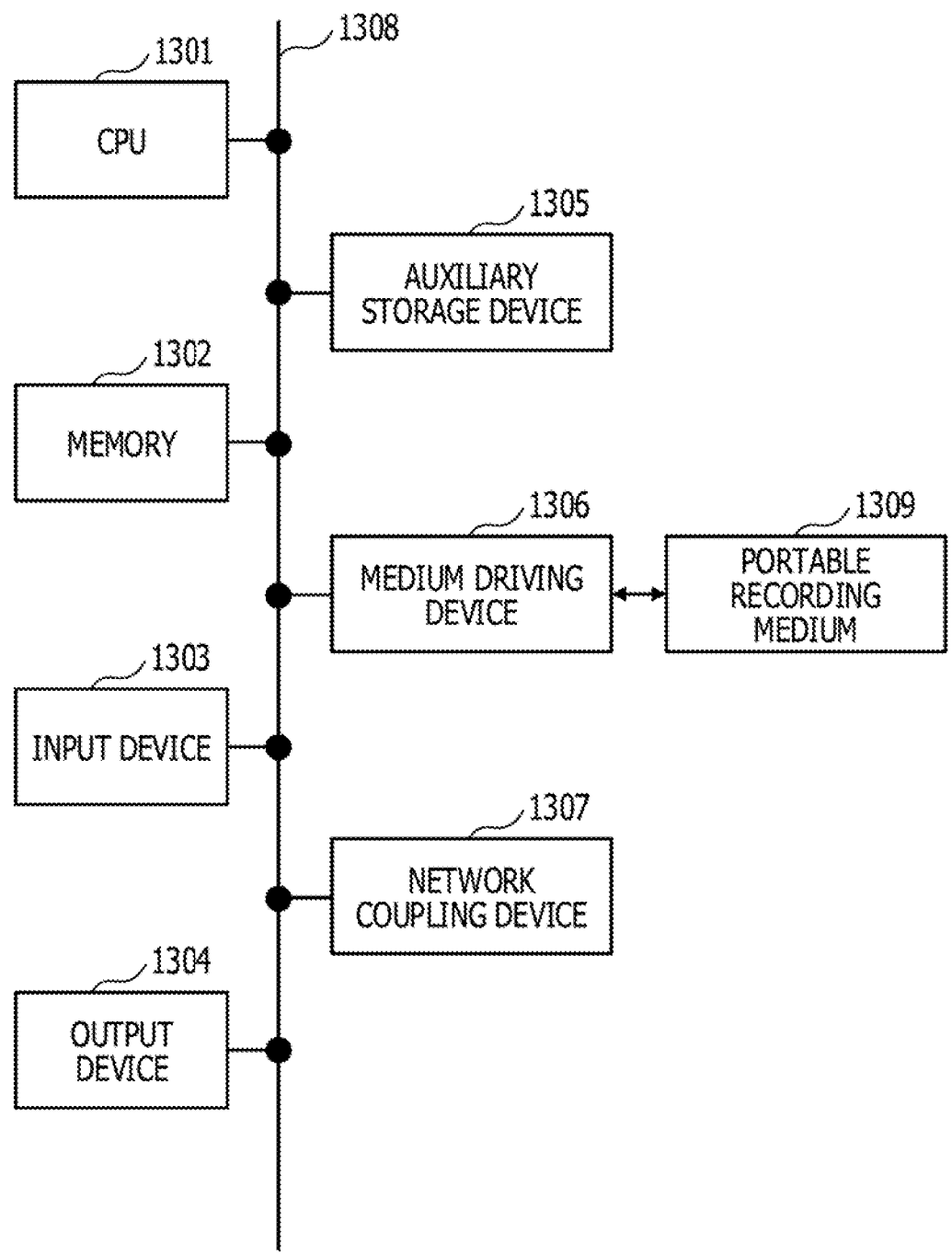
FIG. 13 is a configuration diagram of an information processing apparatus.

FIG. 13 illustrates a configuration example of an information processing apparatus used as the data processing apparatus 101 in FIG. 1 and the data processing apparatus 301 in FIG. 3. The information processing apparatus in FIG. 13 includes a central processing unit (CPU) 1301, a memory 1302, an input device 1303, an output device 1304, an auxiliary storage device 1305, a medium driving device 1306, and a network coupling device 1307. These components are coupled to each other by a bus 1308.

The memory 1302 is a semiconductor memory such as a read-only memory (ROM), a random-access memory (RAM), a flash memory, and stores programs and data used for processing, for example. The memory 1302 may be used as the storage unit 111 in FIG. 1 or the storage unit 311 in FIG. 3.

The CPU 1301 (processor) operates as the changing unit 112 in FIG. 1 by executing a program by using the memory 1302, for example. The CPU 1301 also operates as the simulator 312, the image generating unit 313, the learning unit 314, the regression analysis unit 315 and the searching unit 316 in FIG. 3 by executing the program by using the memory 1302.

The input device 1303 is a keyboard, a pointing device, or the like, and is used for inputting instructions or information from an operator or a user, for example. The output device 1304 is a display device, a printer, a speaker or the like, for example, and is used for outputting inquiries or instructions and a processing result to the operator or the user. The processing result may be the proper parameters 330 or may be a circuit diagram, a design drawing, an analysis result or the like. The output device 1304 may be used as the output unit 317 in FIG. 3.

The auxiliary storage devices 1305 is a magnetic disk device, an optical disk device, a magneto-optical disk device, a tape device, or the like, for example. The auxiliary storage device 1305 may be a hard disk drive or a flash memory. The information processing apparatus may cause the auxiliary storage device 1385 to store programs and data and load the programs and data into the memory 1302 for use. The auxiliary storage device 1305 may be used as the storage unit 111 in FIG. 1 or the storage unit 311 in FIG. 3.

The medium driving device 1306 drives the portable recording medium 1309 and accesses the recorded contents. The portable recording medium 1309 is a memory device, a flexible disk, an optical disk, a magneto-optical disk, or the like. The portable recording medium 1309 may be a compact disk read-only memory (CD-ROM), a digital versatile disk (DVD), a Universal Serial Bus (USB) memory, or the like. An operator or a user may cause the portable recording medium 1309 to store programs and data and load the programs and data into the memory 1302 for use.

In this way, the computer readable recording medium that stores programs and data used for processing is a physical (non-transitory) recording medium, such as the memory 1302, the auxiliary storage device 1305, or the portable recording medium 1309.

The network coupling device 1307 is a communication interface circuit which is coupled to a communication network such as a local area network (LAN) and a wide area network (WAN), and performs data conversion for communication. The information processing apparatus may receive programs and data from an external device through the network coupling device 1307 and load the programs and data into the memory 1302 for use. The network coupling device 1307 may be used as the output unit 317 in FIG. 3.

The information processing apparatus may not include all the components in FIG. 13, and it is also possible to omit some components according to the use or condition. For example, when an interface with the user or the operator is not required, the input device 1303 and the output device 1304 may be omitted. In a case where the portable recording medium 1309 or the communication network is not used, the medium driving device 1306 or the network coupling device 1307 may be omitted.

While the disclosed embodiment and their advantages have been described in detail, those skilled in the art may make various modifications, additions, and omissions without departing from the scope of the embodiment explicitly set forth in the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   acquiring, based on a compression model that is acquired by learning processing on a set of data generated by using a combination of values of a plurality of variables and that compresses dimensions of data, a point corresponding to data generated by using a predetermined combination of the values of the plurality of variables within a compressed space;
   acquiring, based on the point corresponding to the data generated by using the predetermined combination, a target point within the space corresponding to a target value of a characteristic changing in accordance with the values of the plurality of variables, and a regression model within the space for a predetermined variable of the plurality of variables, a first value of the predetermined variable from the target point by using the regression model and a second value of the predetermined variable from the point corresponding to the data generated by using the predetermined combination by using the regression model; and acquiring a change amount of the predetermined variable by using a difference between the first value and the second value and a reliability for the regression model; and changing the value of the predetermined variable included in the predetermined combination by using the change amount.

2. The storage medium according to claim 1, wherein
an objective variable of the regression model is the predetermined variable, and
explanatory variables of the regression model are a plurality of variables representing the space.

3. The storage medium according to claim 1, the process further comprising:
generating the regression model by using the set of the data and the compression model; and
acquiring the reliability for the regression model by using the set of the data, the compression model, and the regression model.

4. The storage medium according to claim 1, the process further comprising:
acquiring a change amount of each of the plurality of variables based on the point corresponding to the data generated by using the predetermined combination, the target point, and the regression model within the space for each of the plurality of variables; and
changing the value of each of the plurality of variables included in the predetermined combination by using the change amount of each of the plurality of variables.

5. The storage medium according to claim 1, the process further comprising:
generating changed data and calculating the value of the characteristic by using the changed value of each of the plurality of variables; and
when a difference between the calculated value and the target value is higher than a threshold value, changing the changed value of each of the plurality of variables by using the changed value of each of the plurality of variables as the predetermined combination,
wherein the process for changing the changed value of each of the plurality of variables is repeated until the difference between the calculated value and the target value gets lower than the threshold value.

6. The storage medium according to claim 1, the process further comprising acquiring the compression model by performing learning processing on the set of the data.

7. The storage medium according to claim 6, the process further comprising:
generating time-series data by executing a simulation on an analysis target by using each of a plurality of combinations of the values of the plurality of variables;
generating an image representing the time-series data generated from each of the plurality of combinations; and
learning a set of the images generated from the plurality of time-series data.

8. The storage medium according to claim 1, wherein the compression model is a variational autoencoder.

9. A data processing method to be executed by a computer, the data processing method comprising:
acquiring, based on a compression model that is acquired by learning processing on a set of data generated by using a combination of values of a plurality of variables and that compresses dimensions of data, a point corresponding to data generated by using a predetermined combination of the values of the plurality of variables within a compressed space;
acquiring, based on the point corresponding to the data generated by using the predetermined combination, a target point within the space corresponding to a target value of a characteristic changing in accordance with the values of the plurality of variables, and a regression model within the space for a predetermined variable of the plurality of variables, a first value of the predetermined variable from the target point by using the regression model and a second value of the predetermined variable from the point corresponding to the data generated by using the predetermined combination by using the regression model; and
acquiring a change amount of the predetermined variable by using a difference between the first value and the second value and a reliability for the regression model; and
changing the value of the predetermined variable included in the predetermined combination by using the change amount.

* * * * *